United States Patent [19]

Sager et al.

[11] Patent Number: 5,041,907
[45] Date of Patent: Aug. 20, 1991

[54] AUTOMATED ASSEMBLY AND PACKAGING SYSTEM

[75] Inventors: James L. Sager, Boulder; Michael R. Schmehl, Aurora, both of Colo.

[73] Assignee: Technistar Corporation, Longmont, Colo.

[21] Appl. No.: 484,565

[22] Filed: Feb. 23, 1990

Related U.S. Application Data

[63] Continuation-in-part of Ser. No. 472,044, Jan. 29, 1990.

[51] Int. Cl.$^5$ ............................................. H04N 7/18
[52] U.S. Cl. .................................... 358/101; 364/478; 901/8
[58] Field of Search ................. 358/101, 903; 364/468, 364/478; 901/7, 8; 382/8; 209/577, 939

[56] References Cited

U.S. PATENT DOCUMENTS

| | | | |
|---|---|---|---|
| 3,958,682 | 5/1976 | Martin | 198/19 |
| 4,033,448 | 7/1977 | McFarlane et al. | 198/465 |
| 4,084,684 | 4/1978 | Skinner, II | 198/467 |
| 4,105,925 | 8/1978 | Rossol et al. | 250/561 |
| 4,527,326 | 7/1985 | Kohno et al. | 29/705 |
| 4,674,181 | 6/1987 | Hamada et al. | 29/703 |
| 4,770,121 | 9/1988 | Ebata et al. | 118/686 |
| 4,771,468 | 9/1988 | Batchelder et al. | 382/8 |
| 4,810,154 | 3/1989 | Klemmer et al. | 414/222 |
| 4,832,180 | 5/1989 | Ferrero | 198/468.3 |
| 4,851,902 | 7/1989 | Tezuka et al. | 358/101 |
| 4,866,629 | 9/1989 | Chen et al. | 358/101 X |
| 4,870,590 | 9/1989 | Kawata et al. | 364/468 |
| 4,941,182 | 7/1990 | Patel | 382/1 |

Primary Examiner—Victor R. Kostak
Attorney, Agent, or Firm—Beaton & Swanson

[57] ABSTRACT

An apparatus and method for picking up and manipulating randomly oriented and randomly positioned objects moving on an object belt and transferring them to randomly oriented and randomly positioned destinations moving on a destination belt. An image processing unit using a vision system identifies and locates objects and destinations in successive overlapping vision windows up to a predetermined optimum number of objects. The locations of those objects and destinations are entered in an output queue which is transmitted to the object and destination location queues of a first robot motion controller. The first robot picks up and deposits to destinations all the objects it can in the time available while the objects and destinations pass, and enters the locations of the objects not picked up and destinations to which no object is placed in an output queue which is transmitted to the object and destination location queues of a second robot motion controller. The robots can be arranged in a series of any number and the image processing units and vision systems can also be arranged in a series.

32 Claims, 14 Drawing Sheets

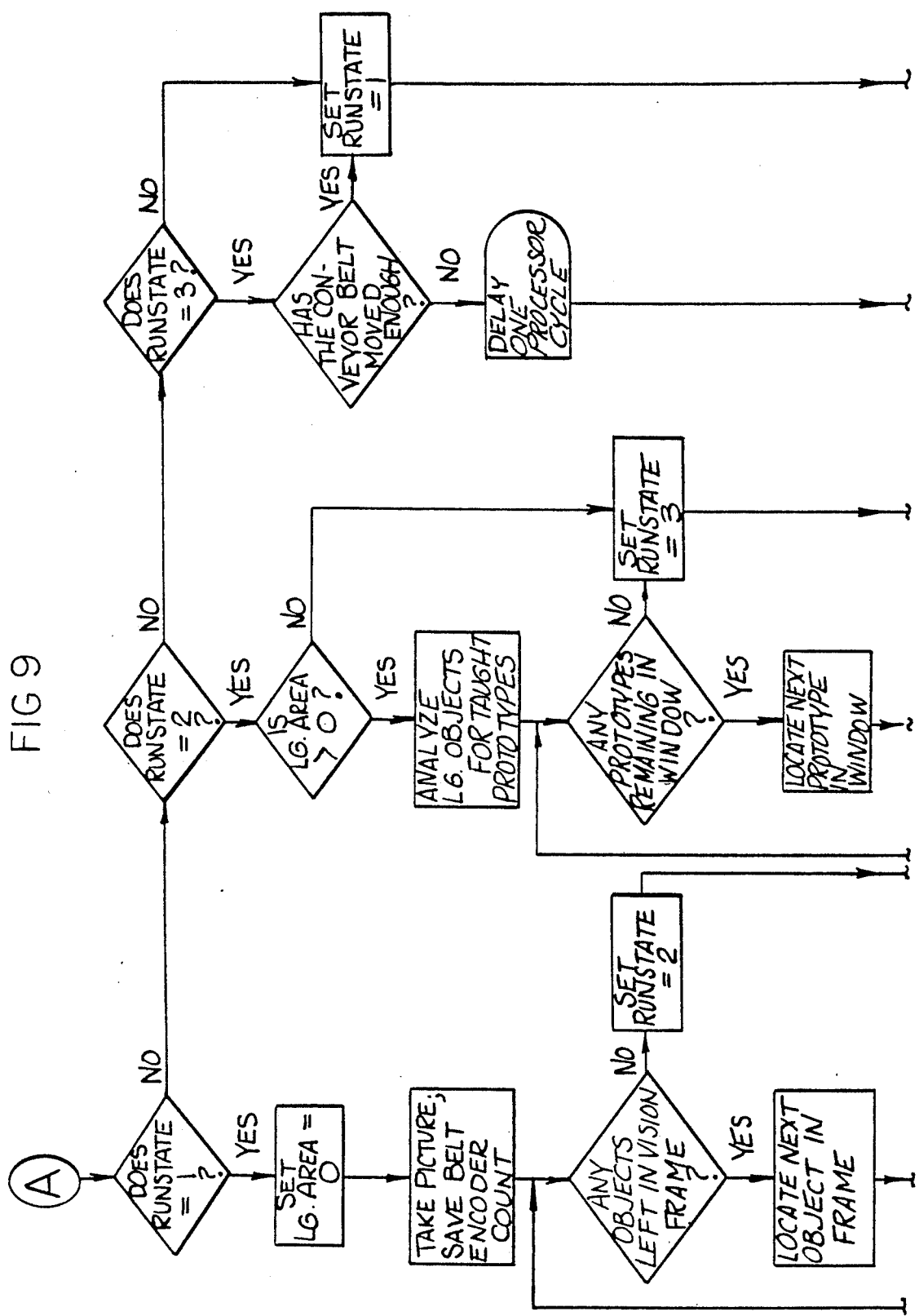

AUTOMATED ASSEMBLY AND PACKAGING SYSTEM

This is a continuation-in-part of application no. 07/472,044 filed Jan. 29, 1990 for Automated Assembly and Packaging System.

BACKGROUND OF THE INVENTION

The use of robots in assembly and packaging is well known. In particular, robots have been used widely in automobile manufacturing and electronic components assembly. Robots can work all day, every day, without interruption, except for occasional maintenance and repair.

Known methods and apparatus for assembly and packaging using robots rely upon the substantial uniformity in size and shape among the objects to be assembled or packaged and their precise location. These known methods and apparatus are generally not effective with randomly positioned and randomly oriented objects. This is typically the case with objects that are deposited onto a conveyor belt, such as flat components that are asymmetrical about at least one axis. For these parts, the system must locate them on the moving conveyor belt and also determine their orientation. This requires a relatively sophisticated vision system. It also requires a method for choosing which of several objects on the belt should be picked up and in what order. These known methods are also generally not effective in placing objects onto a moving conveyor belt, especially if the placement is to a random position and a random orientation, or at least a variable position and a variable orientation.

While the robotic manufacture and assembly of objects that are randomly positioned with random orientations on a conveyor belt presents particular difficulties, this is also an area where robots are especially needed. Performing the necessary operations by hand is likely to require short repetitive hand motions which can cause carpaltunnel syndrome and other long-term disabilities.

Included in this field is the packaging of food such as cookies, crackers and candies which are usually of a random orientation and a random position on a belt as they are dispensed from an oven or other manufacturing facility. Sometimes the food must be placed onto another moving belt, such as a moving belt carrying the package. In other applications, an object such as a cookie on one moving belt must be placed on top of another object such as another cookie to make a cookie sandwich. Packaging food by robots is particularly attractive because it overcomes sensitive sanitation concerns related to hand packaging. The existing systems for robotic packaging of food, like most of the existing systems for other robotic applications, rely on an orderly presentation of the objects to be packaged and a uniform presentation of the packaging. For example, the food packaging device disclosed in U.S. Pat. No. 4,832,180 requires that the objects to be packaged be substantially the same size, arranged in a row, and an equal distance from each other.

SUMMARY OF THE INVENTION

This invention provides a method and apparatus which uses a vision-equipped robotic system to locate, identify and determine the orientation of objects, and to pick them up and transfer them to a moving or stationary destination.

An object video camera periodically records images of objects located on a moving object conveyor belt. The images are identified and their position and orientation is recorded in a moving object conveyor belt coordinate system. A second video camera periodically records images of destinations on a destination conveyor belt. The destinations are located and their position and orientation is recorded in a moving destination conveyor belt coordinate system.

The information is transmitted to a motion control device associated with a first robot. The motion control device coordinates the robot with the object moving belt coordinate system and instructs the robot arm to pick up certain objects that are favorably positioned in that robot's pre-determined pick-up window. The motion control device also coordinates the robot with the moving destination belt coordinate system and instructs the robot to deposit the objects it picks up in the destinations on the destination conveyor belt. The object conveyor belt conveys the objects that are still not picked up after passing through the first robot's pick-up window to a second robot. The motion control device for the first robot transfers the position and orientation of those objects it did not pick up on the object conveyor belt and the position and orientations of the destinations it did not deposit objects on the destination conveyor belt to the motion control device for the second robot.

The process is a continuous one which operates in real time. The two video cameras record images in discrete vision windows at a regular rate to cover all of each belt as it moves under the stationary camera. The information from each vision window is transferred to the first robot motion controller at the same rate that the images are recorded by the video camera, and then on to each subsequent motion controller at that same rate. Any number of robots with their associated motion control devices can be put in series under a given vision system, and any number of vision systems can be put in series.

BRIEF DESCRIPTION OF THE DRAWINGS

FIGS. 9 and 9a show a vision process for locating destinations on a moving destination belt, wherein the objects are picked up from a stationary pick-up point.

DETAILED DESCRIPTION OF THE PREFERRED EMBODIMENT

Figure 1:
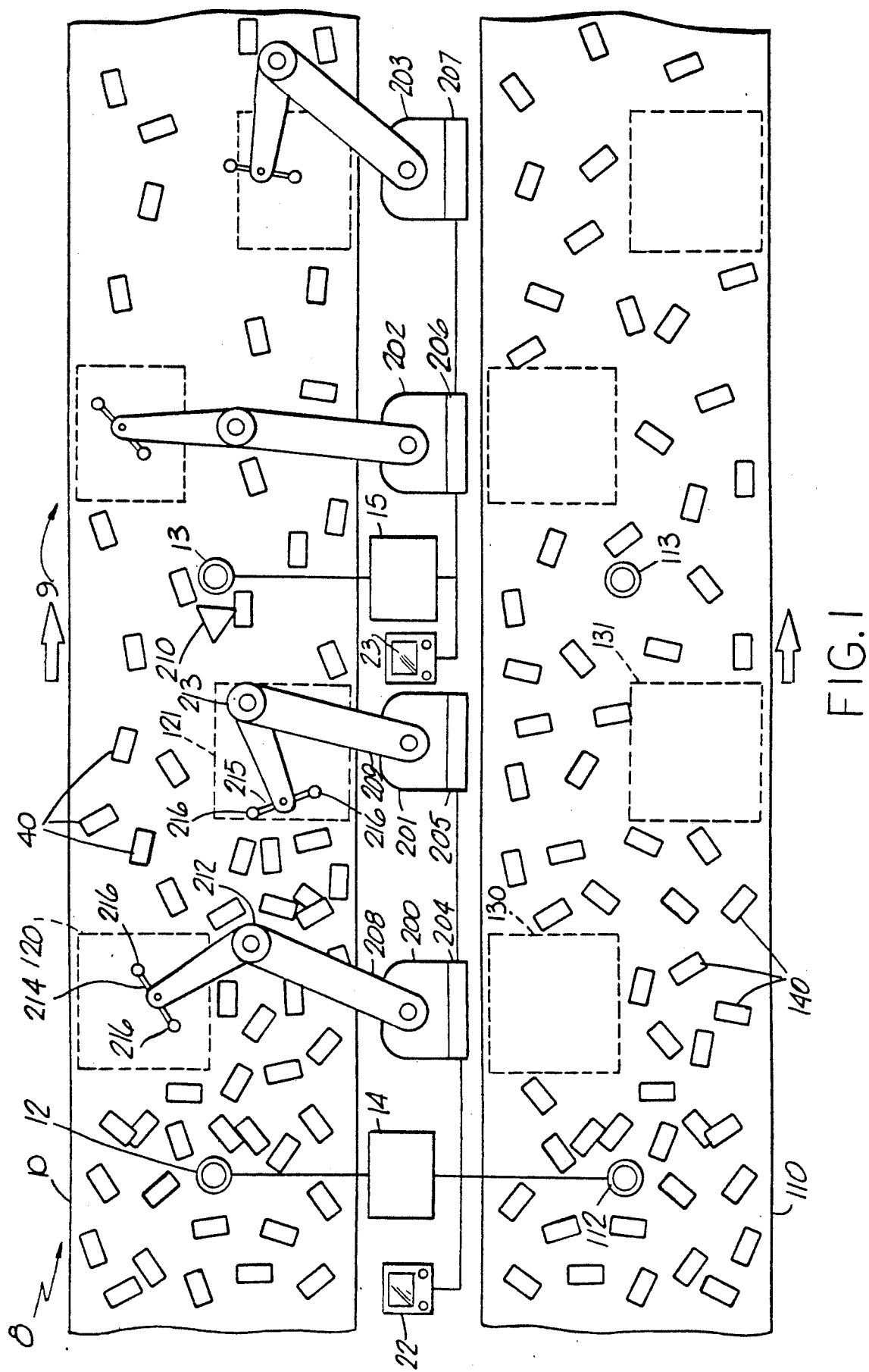
FIG. 1 shows a schematic top plan view of the conveyor belts, two vision systems in series and their robots of the present invention.

The overall apparatus is shown in FIG. 1. The basic elements of the apparatus 8 are an object conveyor belt 10, a destination conveyor belt 110, an object video camera 12, a destination video camera 112, an image processing unit 14, and one or more robots 200 and 201. Each robot has an associated motion controller 204 and 205, a robot arm 208 and 209 with one or more pivot points 212 and 213, an end effector 214 and 215 holding one or more pick-up cups 216. The pick-up cups in the preferred embodiment are resilient inverted cup-shaped vacuum-actuated members which move downward to contact the belt objects and lift them by a suction force. These basic hardware elements are well-known in the art. For example, the robot may be the Adept One Manipulator and the vision system may be Adeptvision, both by Adept Technology, Inc. The pick-up devices may also be gripping or slotted devices or any other device capable of moving the desired object.

A plurality of objects 40 to be assembled or packaged are located on the object conveyor belt 10, and a plurality of destinations 140 are located on the destination conveyor belt 110. In all Figures the objects 40 and destinations 140 are being conveyed from left to right, as indicated. In one application of the preferred embodiment the objects 40 are the upper half of wafer-shaped sandwich cookies, and the destinations 140 are the lower half of the wafer-shaped sandwich cookies. The process picks up the upper halves of the cookies from the object belt and places them onto the lower halves on the destination belt. The invention can be applied to a wide variety of other food and non-food items.

The video cameras 12 and 112 remain stationary while the surface of the conveyor belts 10 and 110 move under them. As the conveyor belts 10 and 110 move underneath the video cameras 12 and 112, the cameras and a strobe light or other appropriate means (not shown) is activated at periodic belt intervals so that the video cameras 12 and 112 photograph a series of static images of portions of the conveyor belts 10 and 110 and the objects 40 and 140 located on the conveyor belts 10 and 110. The cameras and strobes activate at fixed intervals in order to space the vision window images appropriately. The portion of the conveyor belts 10 and 110 that are photographed by the video cameras 12 and 112 are deemed vision windows, and the images photographed are deemed vision windows images.

Each belt turns a friction wheel (not shown) to generate a belt encoder signal allowing a measurement of the belt travel. Each belt encoder signal is equivalent to a discrete distance of belt travel such as, for example, 1.0 millimeter. The video cameras and strobes are activated at predetermined intervals of belt travel to space the vision window images as desired. By recording the belt encoder signal at the time the strobe is activated, and knowing the direction of belt travel and the number of belt encoder signals that elapse, the system can track the motion of the objects along the known vector in the direction of belt travel.

Figure 2:
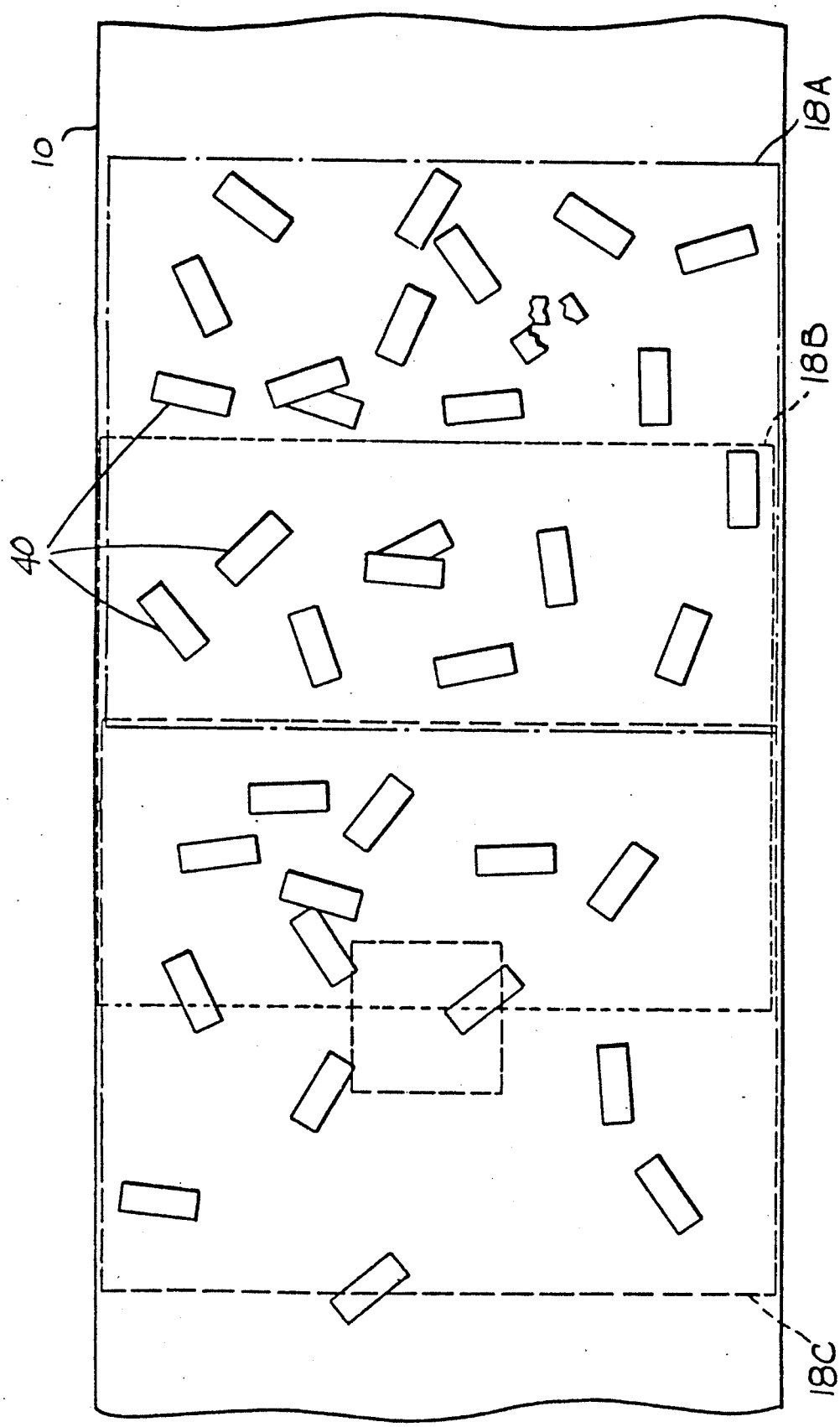
FIG. 2 shows a schematic top plan view of an example section of an object conveyor belt with randomly located objects, showing three object vision windows.

A vision window image 18 is substantially the same width as the conveyor belt 10. In the preferred embodiment the vision window images 18 are substantially square, although the invention does not require a particular vision window image shape. FIG. 2 shows the object conveyor belt 10, conveyed objects 40, and three consecutive vision window images 18A, 18B and 18C. The vision window images 18 overlap to avoid missing any objects that might bridge a boundary between successive vision window images. For example, in FIG. 2 the portion of the conveyor belt 10 and the objects 40 in the left half of vision window image 18A are also in the right half of vision window image 18B. In the example shown in FIG. 2, the overlap is 50%, but any overlap greater than the longest dimension of an object on the belt will suffice.

An automatic digital processor which is part of the image processing unit 14 converts the analog video signals in each static vision window image into digital data. This process is well known. For example, the conversion can begin by assigning each pixel in the image an address (i,j), where i represents the pixel's location along the axis parallel to the belt 10 and j represents the pixel's location along the axis perpendicular to the belt 10. Each pixel (i,j) is then assigned a gray scale value from, for example, 1 to 128 in proportion to the darkness of the pixel. The digitized image is then stored in computer memory as an array.

The digitized image is further processed to remove all gray scale values to produce a binary image. All array locations with gray scale values greater than a threshold value are assigned the value 1 and all array locations with gray scale values less than or equal to the threshold value are assigned the value 0. The actual threshold value will vary depending on the lighting, particular applications of conveyor belts, objects and video cameras. The resulting digital image is stored in computer memory as an array of 1s and 0s.

Figure 3:
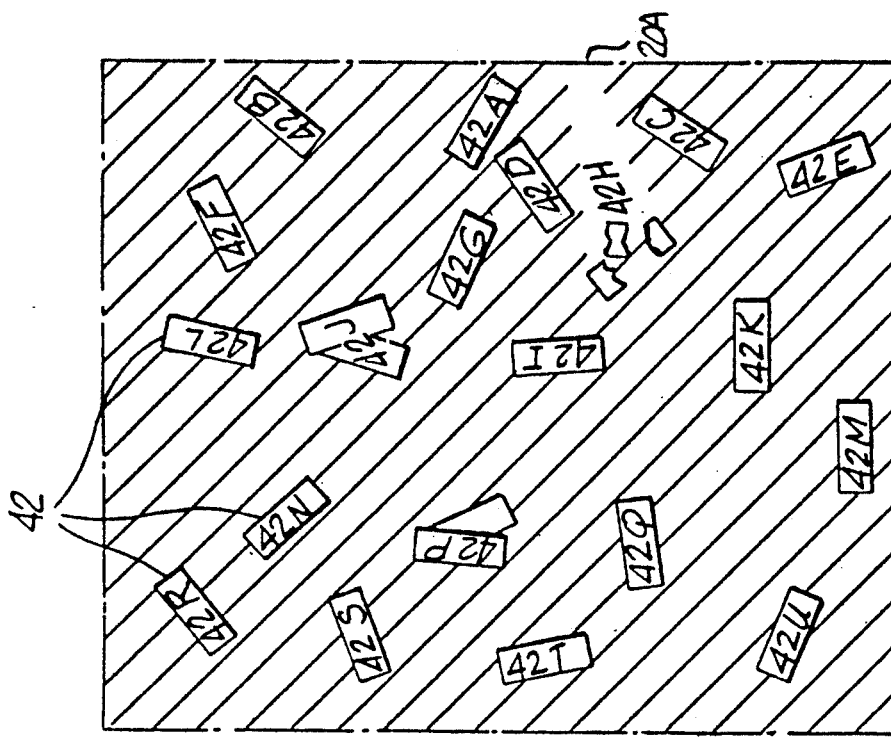
FIG. 3 shows in detail two windows shown in FIG. 2.
Figure 3:
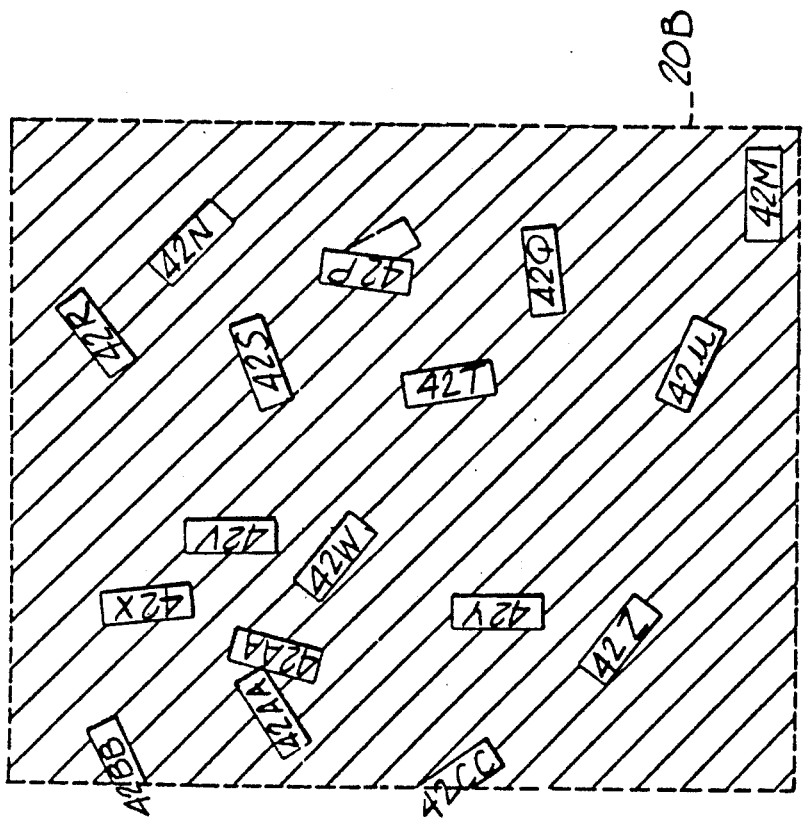

FIG. 3 represents the analog equivalents 20A and 20B of the digitally processed images corresponding to object vision windows 18A and 18B, respectively. The cross-hatched areas are the analog equivalents of image array locations whose values are 1 and the white areas are the analog equivalents of image array locations whose values are 0. The object images 42 correspond to the objects 40 in FIG. 2. FIG. 3 may actually be shown on a video monitor 22 used with the system as shown in FIG. 1.

Figure 4:
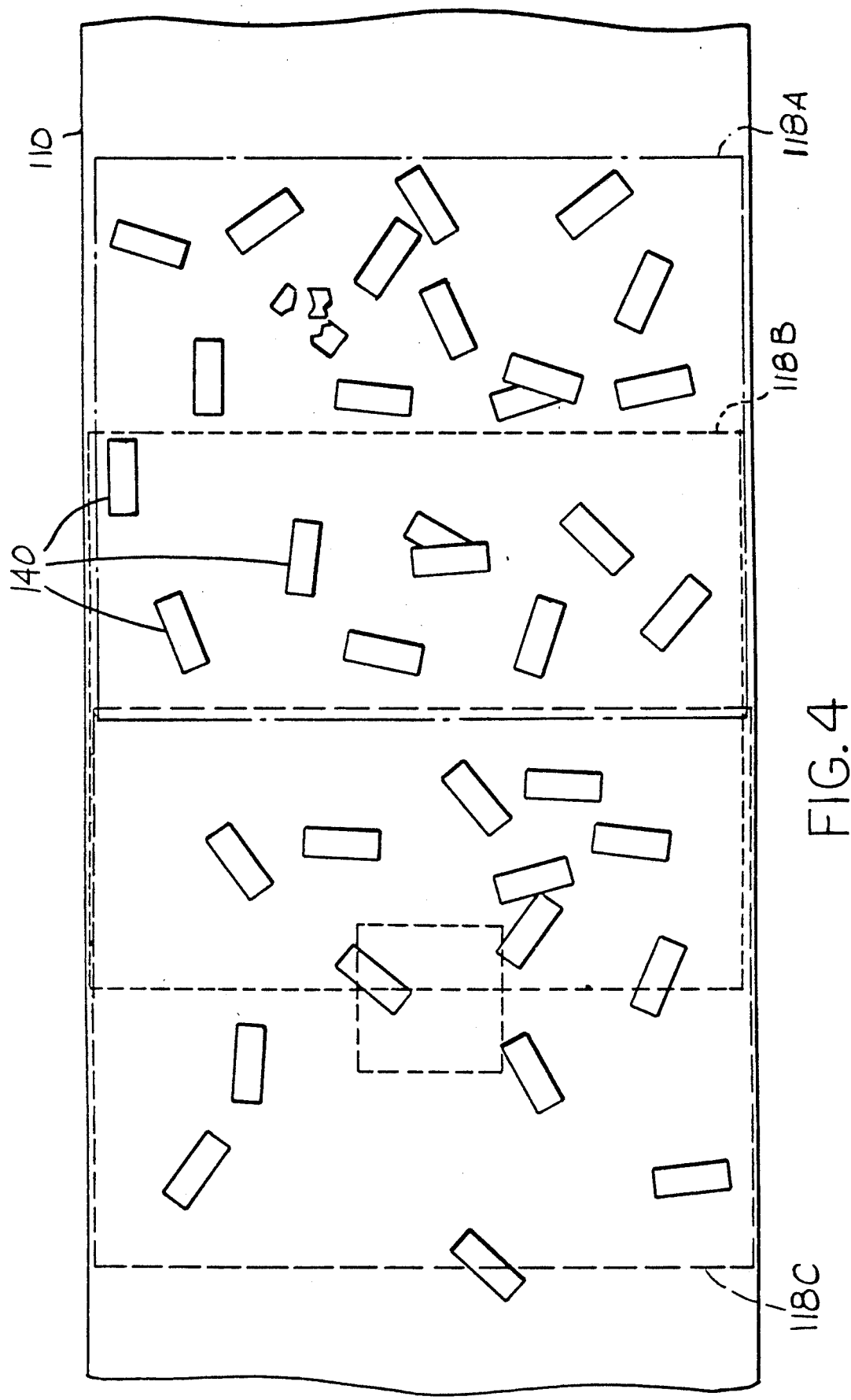
FIG. 4 shows a schematic top plan view of an example section of a destination conveyor belt with randomly located destinations, showing three destination vision windows.

A similar technique is used with the destinations on the destination belt 110. FIG. 4 shows the destination conveyor belt 110, destinations 140, and three consecutive destination vision window images 118A, 118B and 118C. The destination vision windows overlap in a manner similar to the object vision windows, and the analog video signal is digitized in a similar manner.

Figure 5:
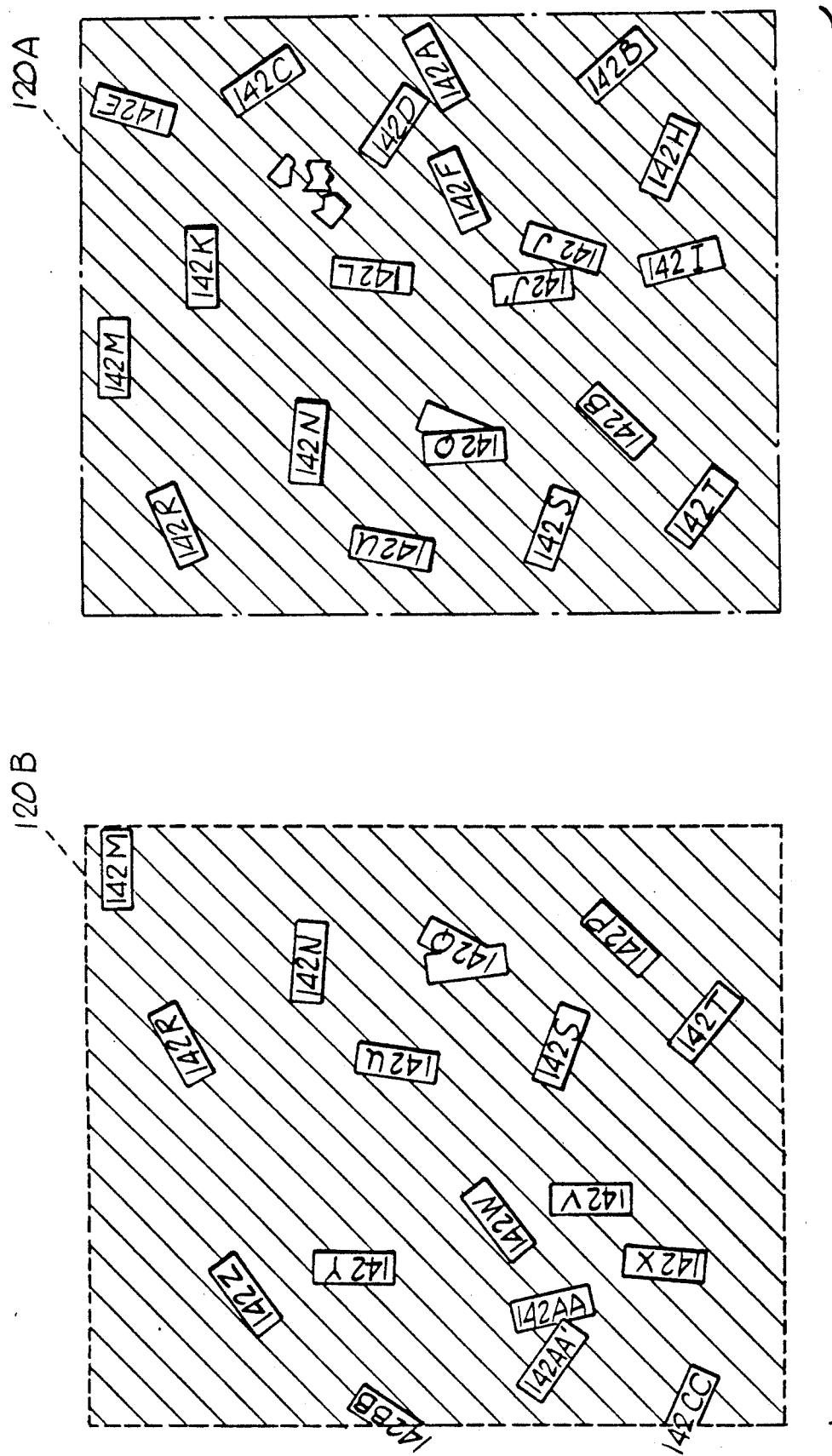
FIG. 5 shows in detail two windows shown in FIG. 4.

FIG. 5 represents the analog equivalents 120A and 120B of the digitally processed images corresponding to destination windows 118A and 118B, respectively. As in the case of the analog equivalents 20A and 20B of the digitally processed images corresponding to the object images 18A and 18B, the analog equivalents 120A and 120B of the digitally processed images corresponding to the destination images 118A and 118B can be shown on a video monitor 22 as shown in FIG. 1.

Figure 6:
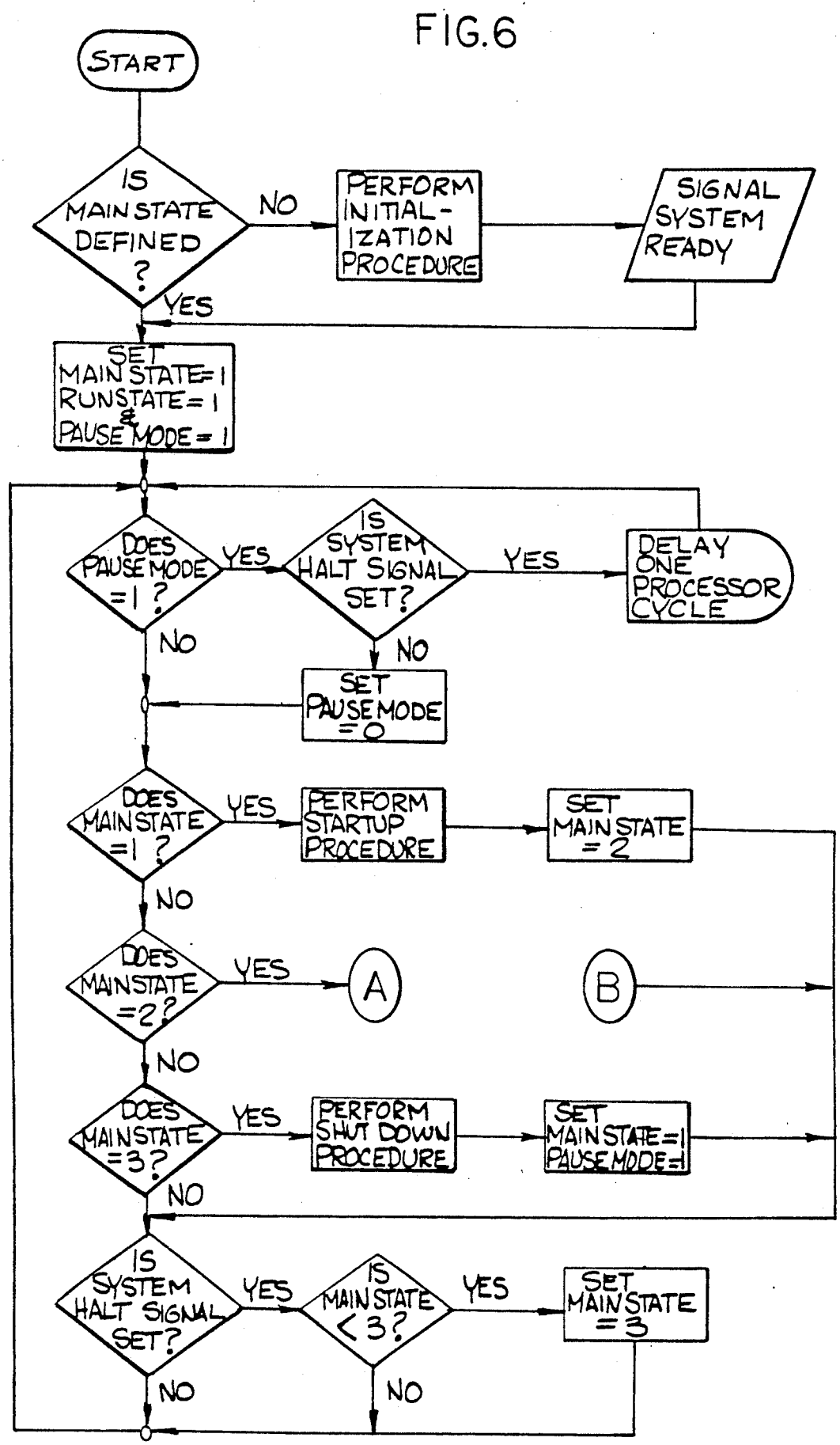
FIG. 6 shows a flow chart of the main control process of the invention.

The images 20 and 120 are then processed by the image processing unit 14. The computer program embodiment of the process utilizes a state table architecture common to both the vision recognition and robot control programs to consolidate status checking and to allow quick reaction to errors conditions or external input. FIG. 6 shows the main control process which is based around a three stage mainstate table: mainstate 1 indicates a start-up procedure, mainstate 2 indicates a run procedure, and mainstate 3 indicates a shut-down procedure. In addition, a pause element is used which allows program operation to be temporarily suspended without further evaluation of the program's mainstate.

The image processing unit (or motion control unit in the case of the robot control program) initially checks whether a mainstate is defined. If not, as when the computer control unit is first powered up, then it is necessary to perform an initialization procedure to establish the moving belt coordinate system, create a new error log, initiate secondary program processes to control the operator interface and data communications, define and set all globally used variables and switches, set the system halt signal to 1 for "on", and, in the case of image processing, to initialize camera software settings and vision recognition parameters. The details of all these initialization procedures would be apparent to one skilled in the art.

After performing the initialization procedure if one is necessary, the unit sets the initial value of the primary state variables, mainstate and runstate, to 1. In addition, the pausemode is also set to 1 to indicate that it is "on." The unit's program then begins the main control loop.

The unit first checks whether the pause mode is in effect. If it is, as it will be initially, the unit then checks if the system halt signal is on as it will also be initially. If it is, the unit proceeds no further and returns to the beginning of the main control loop. This process is repeated until the system halt signal is set to 0 for "off". This happens as a result of an operator interaction with a secondary task controlling the operator interface. When the system is started (system halt signal set to 0), the program evaluates the pausemode which is on, then evaluates the system halt signal which is off, and accordingly sets the pause mode to 0 to indicate that it is also now "off".

The unit next checks the mainstate. If it is 1, as it is initially, the unit performs a start-up procedure to initialize counters and to calibrate for the chosen object/destination configuration form among several which may be stored in the image processing unit. The system then increments the mainstate to 2 to indicate that the "run" process is to be performed. Control is then passed to the end of the main control loop where the system halt signal is evaluated. If the halt signal has been set to 1 or "on" and if the mainstate is less than 3, the mainstate is set to 3 to indicate that a shutdown procedure is to be performed. If the halt signal is 0 or "off," the process returns to the beginning of the main control loop.

If the mainstate is not 1, the unit checks whether the mainstate is 2. If not, then the mainstate will be 3, and a shutdown procedure is performed to archive the results of the operation, display or print appropriate messages to the operator interface, set the pausemode to on and reset the mainstate to 1. After checking the state of the system halt signal, the process returns to the beginning of the main control loop.

Figure 7:
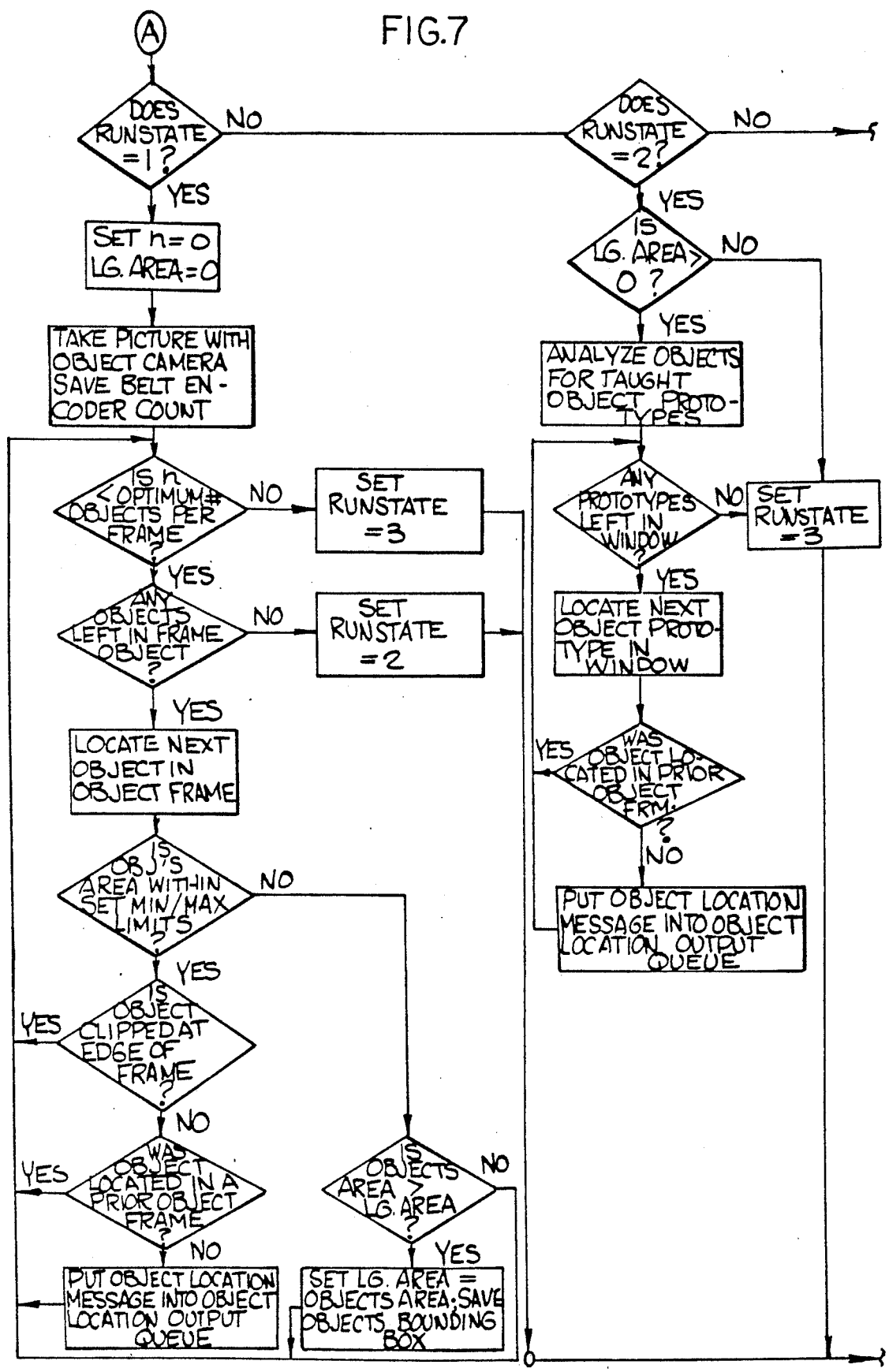
FIGS. 7a and 7b show a vision process for locating objects on a moving object belt and locating destinations on a moving destination belt.
Figure 7A:
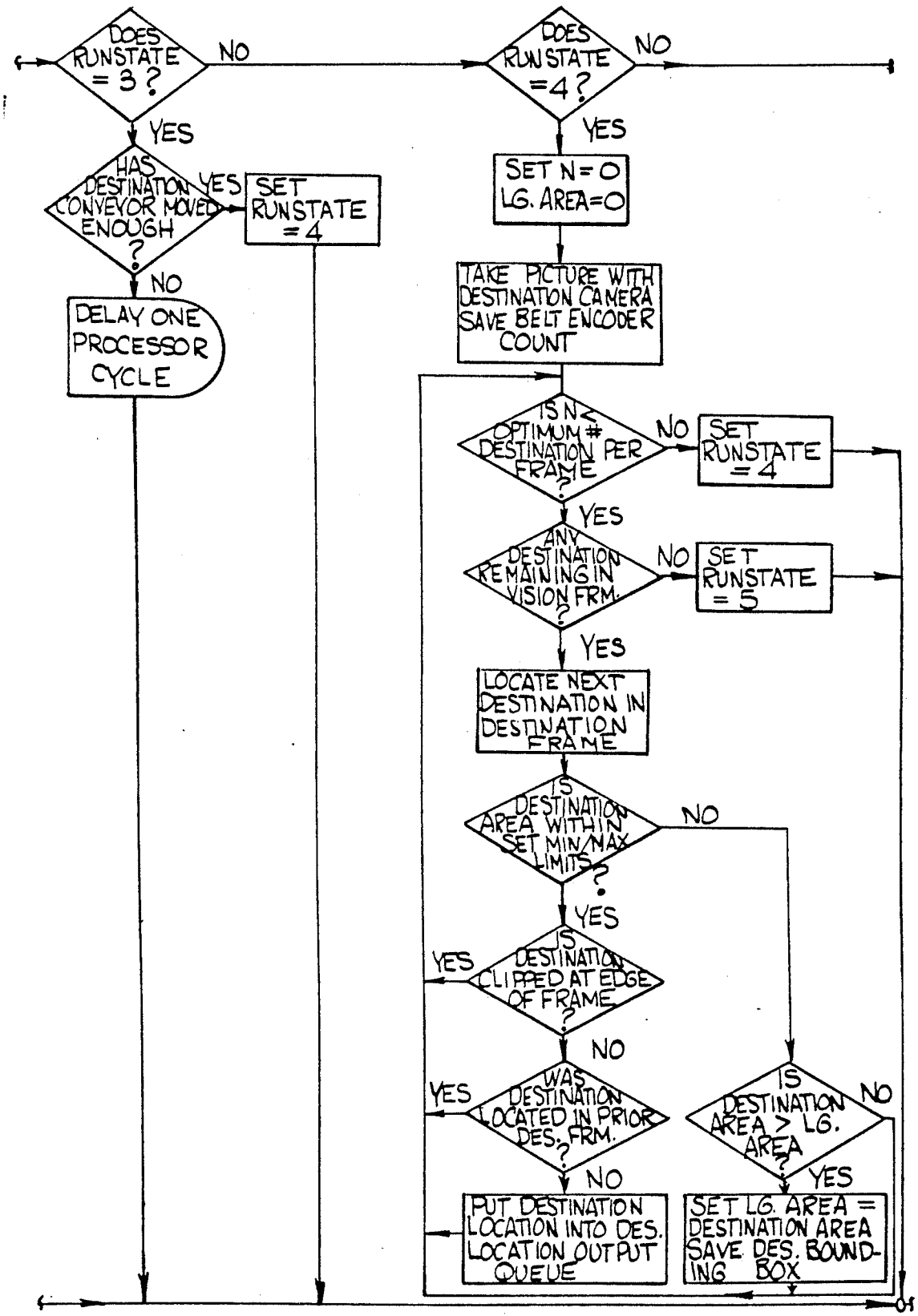
Figure 7B:
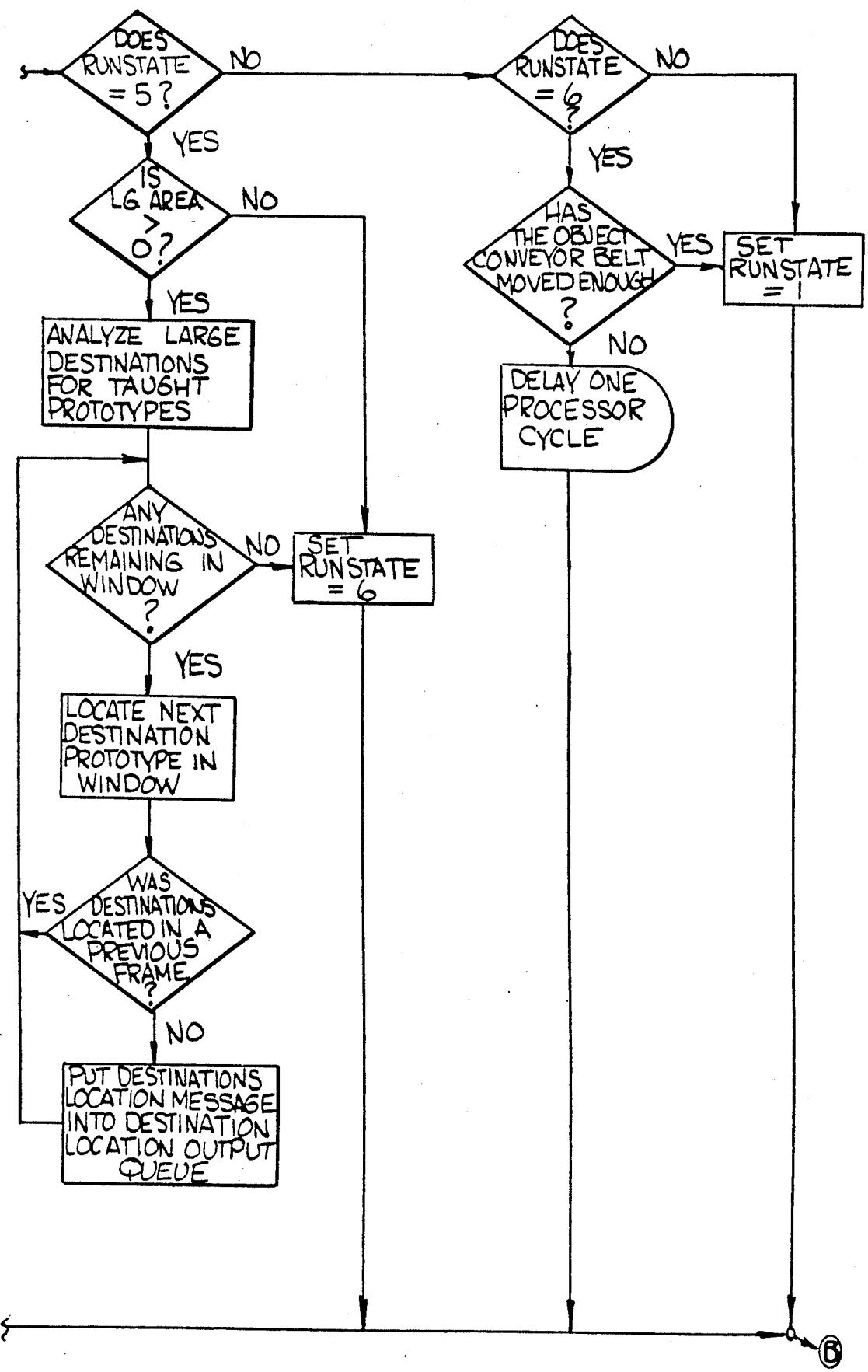

If the mainstate is 2, then the unit proceeds (in the case of the image processing unit) to the object location routine shown in FIG. 7. The beginning and end of that routine, indicated as A and B in FIG. 7, correspond to A and B of the main control process of FIG. 6. The object location routine has a runstate table from 1 through 6, wherein 1 is an object recognition procedure, 2 is a non-standard or prototype object recognition procedure, 3 is a check whether the destination belt has moved far enough to locate destinations in the next destination vision window, 4 is a destination recognition procedure, 5 is a nonstandard or prototype destination recognition procedure, and 6 is a check whether the object belt has moved far enough to locate objects in the next object vision window.

The strobe light associated with the object video camera 12 flashes and the object belt encoder count is recorded. The value "0" is assigned to "n," which represents the number of images recognized in the object vision window image. The value "0" is assigned to Large Area which has the purpose described below. Then the system inquires whether n is less than the Optimum Number of objects in a vision window. The Optimum Number is the predetermined number of objects which the robots that are assigned to that particular vision system are capable of picking up, plus or minus a tolerance, given the speed of the belts, the density and type of the objects, and the robot and packaging parameters. The Optimum Number varies depending on all those factors, and is assigned in the start-up sequence.

If n is not less than the Optimum Number, then the image processing unit stops processing object images, and sets the runstate to 3 to process destination images. If n is less than the Optimum Number, then the image processing unit inquires whether there are any object images in the window that have not already been located in that window. If so, then the next object image is located proceeding from right to left. The image processing unit determines whether that object image falls within the Maximum Area and MINIMUM AREA sizes established in the start-up sequence. If the object image is too small, it is ignored as a fragment or broken object that should not be used. Those objects travel the length of the belt and drop off the end into a receptacle. If the object image is too large, then the image processing unit determines whether the object's area is greater than Large Area. If so, then Large Area is set equal to the object's area and the object's boundaries are recorded for later prototype recognition. The image processing unit then returns to the decision box which inquires whether the Optimum Number of objects have been located in that object vision window image.

If the object is neither smaller than MINIMUM AREA nor larger than Maximum Area, then the image processing unit goes on to check whether any part of it is so close to the vision window image boundary that its edges may be confused with those boundaries or the boundaries will distort the object configuration. This is done by establishing a margin around the vision window image. In the preferred embodiment, the margin is 2%. For example, if the vision window image is 1000 by 1000 millimeters, the margins will be 20 millimeters wide. If any portion of the object is in that margin, then the image processing unit ignores that object. If not, then the image processing unit checks whether the location of that object corresponds within a predetermined tolerance to an object image location that was identified and recorded in a previous vision window image, since each object vision window image overlaps the preceding and subsequent object vision window image by 50%. If the object was identified in a previous object vision window image, then it is ignored because it is already recorded.

If the object was not identified in a previous vision window image, then its location is recorded in the output queue. That constitutes the recording of one image, so n is then made equal to n+1. The image processing unit then returns to the query whether n is less than Optimum Number. As explained above, as soon as n is not less then the Optimum Number, the image processing unit is done processing that object vision window image, and it goes to the destination image processing procedure beginning with runstate 3.

If the number of analyzed images is still less than the Optimum Number, the image processing unit goes on to the next image, still moving from right to left in the direction of belt travel. It repeats this process until n reaches the Optimum Number or there are no images remaining in the vision window image. If there are no images remaining in the vision window image and n is still less than the Optimum Number, then the image processing unit proceeds to the object prototype recognition process beginning with runstate 3.

The first step of the prototype recognition process is to inquire whether Large Area is greater than 0, meaning that at least one image object was identified with an area greater than the Maximum Area parameter set by the start-up sequence. If not, then there are no more objects to be picked up in that vision window image, and the image processing unit proceeds to the destination recognition process beginning with runstate 3. If Large Area is greater than 0, then there is at least one large object image to be analyzed in the vision window image. That analysis is accomplished by comparing the size and configuration of the large object image with a prototype image of the object which the system is then programmed to pick up. If any portion of the large object image corresponds to the prototype, within preset tolerances, then that portion of the large object image is deemed an object and is treated accordingly. Generally, the large object images are of touching objects. In that case, the large object image is segregated into two or more images corresponding to the two or more touching objects.

If n is still less than the Optimum Number, then the image processing unit processes the first large object image proceeding from right to left. If the large object image was located in a previous window, it is disregarded to avoid duplicate entries. If the large object image was not located in a previous vision window, then the location of each individual object image it represents is entered in the object location output queue. Then n is set equal to n+1 and the image processing unit returns to the inquiry whether n is less than the Optimum Number.

The processing of the destinations in the destination vision windows is similar to the processing of the objects in the object vision windows, as indicated in runstates 3, 4 and 5. Once the destination belt has moved for enough for the next destination vision window, as indicated in runstate 3, the process goes to runstate 4. In runstate 4, a destination n is set at 0 and large area is set at 0. The strobe flashes, an image is recorded and the destination belt encoder signal is recorded. The processing of the destination vision window identifies only up to an Optimum Number of destinations in each destination vision window image. When that Optimum Number is reached, runstate is set equal to 6 to wait for another object vision window to move into place. Until the Optimum Number is reached, the unit locates each destination in the window. If the destination is between the predetermined maximum and minimum limits and is not too close to the frame edge and was not already located in the preceding overlapping destination vision window image, then the destination location is entered in the destination location output queue. The unit saves the boundaries of destinations that are not between the predetermined maximum and minimum limits, and after all destinations in that destination vision window image have been located, if n is still less than the optimum, the unit sets runstate equal to 5 and proceeds with destination prototype recognition.

The destination prototype recognition process of runstate 5 is substantially the same as the object prototype recognition process. The unit analyzes destination images that are larger than the maximum limit by comparing them to pre-established shapes. Any that are recognizable and were not identified in the preceding overlapping destination vision window image are entered in the destination location output queue. After all prototypes are analyzed, runstate is set equal to 6 and the unit waits for the object belt to move into position for the next object vision window.

Figure 8:
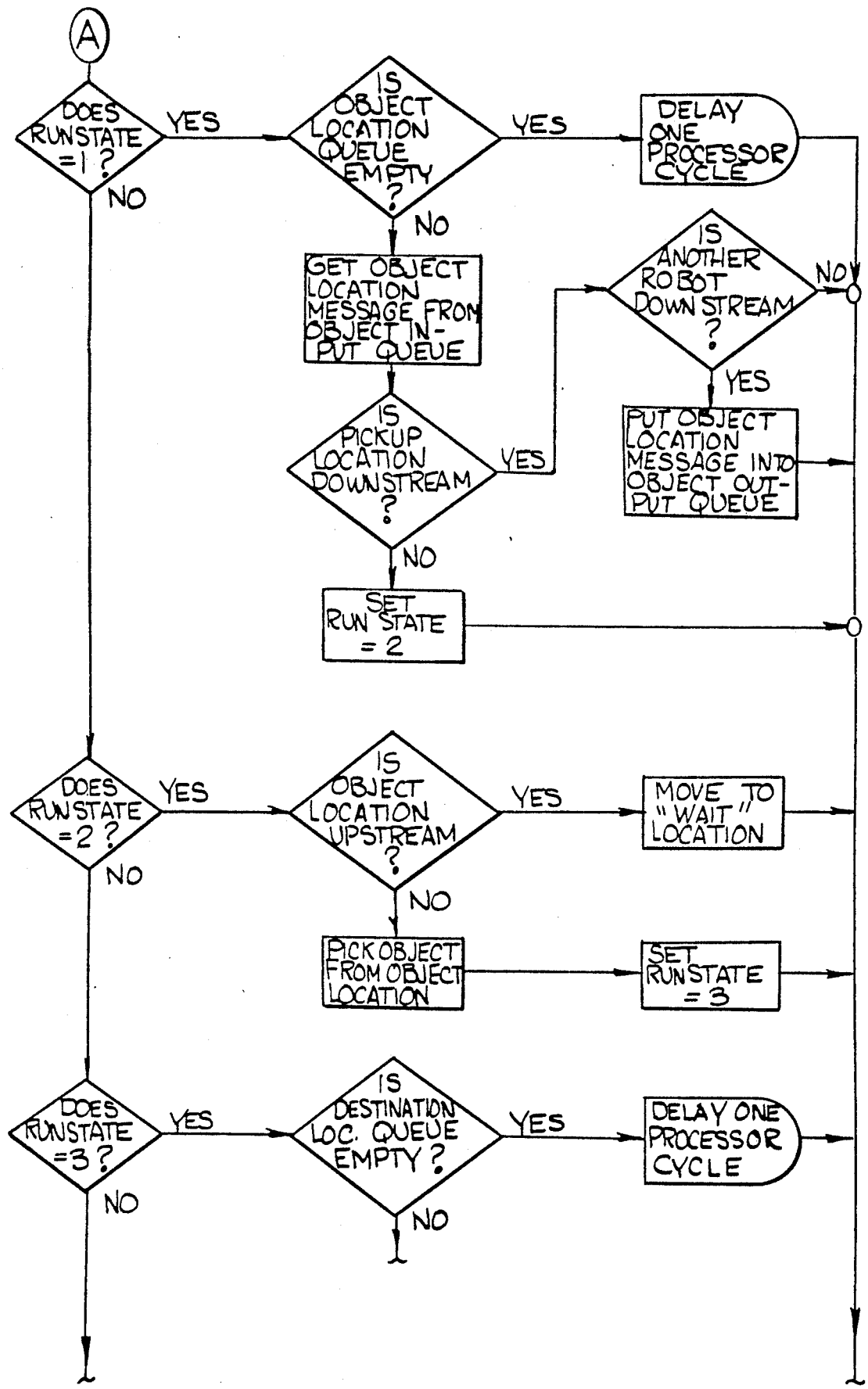
FIGS. 8 and 8a show a robot run process for directing the robot to pick up objects from a moving object belt and to deposit them onto a moving destination belt.
Figure 8A:
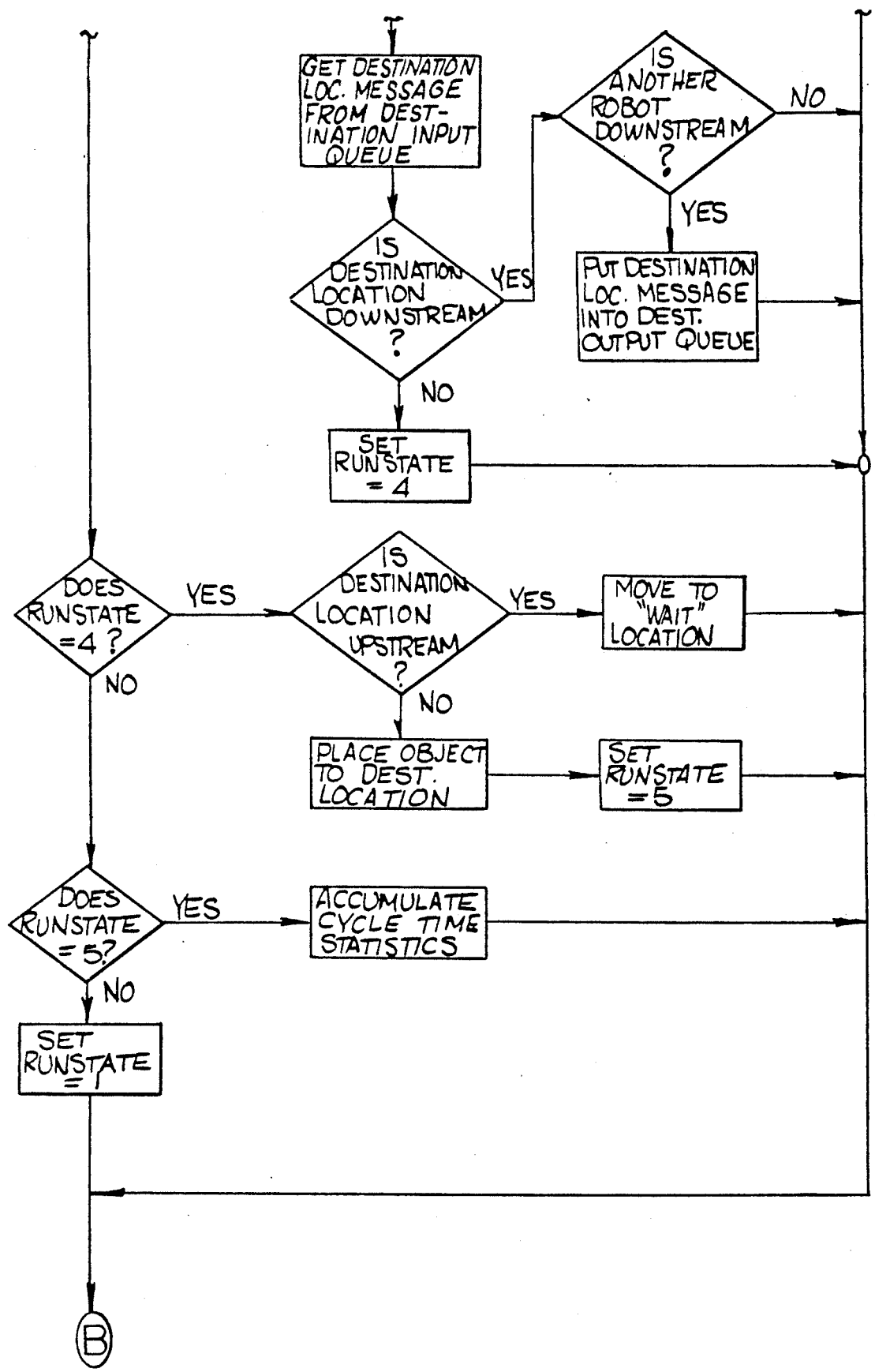

FIG. 8 shows the placement process. The routine utilizes five runstates. If runstate is 1, as it is initially, the unit checks whether the object location queue is empty. If so, then the unit delays a processor cycle and returns to the main routine. If the object location queue is not empty, then the motion controller receives the next object location in the queue. It first checks whether the location of that object is too far in the direction of belt travel for the robot to reach it—that is, whether it has moved past a predetermined pick-up window for that robot. If so, and there is another robot in the direction of belt travel covered by the same vision system, then the object location is entered in the object output queue.

The object location queue is the object output queue from the image processing unit in the case of the first robot adjacent the vision system in the direction of belt movement. In the case of the other robots, the object location queue is the object output queue of the robot adjacent to that robot in the opposite direction from the direction of belt movement. The queues are transmitted using ordinary data transmission means such as cabling. Thus, the object locations "cascade" from one robot to another "downstream" in the direction of belt travel. The locations of objects that are not picked up by each robot are transmitted to the next robot, and so on.

If the object is not too far in the direction of belt travel for the robot to reach it, runstate is set equal to 2 and the process loops through the main control process. The motion controller then checks whether it is too far in the direction opposite the direction of belt travel for the robot to reach it—that is, whether it has not yet moved into the robot pick-up window. If so, then the motion controller instructs the robot arm to move to the position where the object will enter the pick-up window. The motion controller then cycles through the main control process until the object moves into the pick-up window, and then it is picked up.

In determining whether an object has moved past the pick-up window or has not yet moved into the pick-up window, the motion controller considers the time it would take the robot arm to move from its current position to the location of the object and the distance the object would travel on the belt during that time. In other words, an object that is in the pick-up window when the robot is prepared to pick it up, may move out of the pick-up window by the time the robot can reach it. The motion controller considers that movement and will not attempt to pick it up. Similarly, an object that is not yet in the pick-up window when the robot is prepared to pick it up may move into the pick-up window by the time the robot can reach it. The motion controller will go ahead and direct the robot to pick-up that object after accounting for its movement during the time it takes for the robot to reach it.

The robot pick-up window is not necessarily the same size as a vision window. The robot pick-up window is the preferred area on the belt which can be efficiently reached by the robot arm. This preferred area may be something less than all the area the robot arm is capable of reaching, so that the robot avoids inefficient long motions between pick-ups. This is particularly true if the robot end effector has a plurality of pick-up cups that allow multiple pick-ups before returning to the destination site. In that case, the system will work most efficiently if all the pick-up cups are filled from a small pick-up window and then the robot arm moves to the destination site. Of course, the pick-up windows must be established for each robot with consideration of the pick-up windows for the other robots operating under that vision system. For example, if one robot pick-up window covers the far side of the belt, then another robot pick-up window should cover the near side of the belt. This is the case in FIG. 1 where robot 200 covers pick-up window 120 and robot 201 covers pick-up window 121. It may also be desireable to increase the size of the pick-up windows toward the end of the belt as the density of objects on the belt decreases, to minimize the idle time of the robots toward that end. If a robot pick-up window does not extend the complete width of the belt, then of course the motion controller must check whether each object in the object location input queue falls within the narrower pick-up window boundary as well as whether the object is too far upstream or downstream.

If a plurality of cups are on the robot end effector, each cup is filled before the robot arm moves to the destination point. After each end effector cup is filled with an object, the motion controller returns to the last system halt signal query to repeat the pick-up routine for another cup until all cups are filled.

The motion controller then directs the robot arm to deposit the objects at the appropriate destination site. The placement of the object to the destination is similar to the picking up of the object. The unit checks whether the destination location queue is empty. If so, it delays a processor cycle and returns to the main program repeatedly until the queue is no longer empty. When the queue is no longer empty, the unit gets a destination location and checks whether it is too far in the direction of belt travel for the robot to reach it. If so, then it checks whether it is too far in the direction of belt travel for the robot to reach it. If so, then it checks whether there is a next robot in the direction of belt travel to forward that destination location to. If the destination location is not too far in the direction of belt travel, runstate is set equal to 4 and the unit returns to the main program.

At runstate 4, the unit checks whether the destination location is too far opposite the direction of belt travel. If so, the unit moves to a wait location that is where this destination will first be in a position that is not too far opposite the direction of belt travel and then the unit returns to the main control process and repeats the cycle until the destination is no longer too far opposite the direction of belt travel. The object is then placed at the destination, and runstate is set to 5. At runstate 5, the unit accumulates and archives statistics for the run and then resets runstate to 1.

The placement of objects to a destination may utilize destination placement windows 130 and 131 analogous to the object pick-up windows 120 and 121, in order to minimize the robot arm travel to a predetermined preferred area. As in the case of the object pick-up windows, the destination placement windows depend on the number of end effectors on the robot arm, the density of objects being placed and destinations to which they are placed, the destination placement window scheme of other robots serving the belts, and other factors.

A hypothetical example of the image recognition process is useful. The example will use object vision window images 20A and 20B in FIG. 3 which are the analog equivalent to object vision window images 18A and 18B, respectively, from FIG. 2, and the example will use destination vision windows 120A and 120B in FIG. 5 which are the analog equivalent to destination vision window images 118A and 118B, respectively, from FIG. 4. The Optimum Number is given to be 15. As a convention, the routine will sweep across each vision window image beginning at a leading edge corner and extending in a direction perpendicular to the belt travel so that each point is analyzed once. The image is reduced to a binary image in the manner previously explained.

In the object vision window image 20A, object images 42A, 42B, 42C, 42D, 42E, 42F, 42G, 42I, 42K, 42L, 42N, 42Q, 42R, 42S and 42T, in that order, are identified as object images and their locations are entered in the object vision window image output queue. Object image 42H (a broken cookie) and object images 42J and 42P (cookies which overlap) are not identified. Object image 42M is too close to the edge of the image 20A to be identified. Object 42U is not identified and no prototype identification is attempted because 15 object images, equal to the object vision window image Optimum Number, have been identified. The locations of those objects are entered in the output queue and are transmitted to the first motion controller using ordinary data transmission means such as cabling. Because this is the first vision window image analyzed in this vision system, there are no duplicates from preceding vision window images.

The destination vision window image is processed in a similar manner. Destination images 142C, 142D, 142F, 142H, 142I, 142K, 142L, 142N, 142P, 142R, 142S, 142T and 142U, in that order, are identified as destination images and their locations are entered in the destination vision window image output queue. Destination image 142G (a broken cookie) and destination images 142J and 142Q (cookies which overlap) are not identified. Destination images 142A, 142B, 142E and 142M are too close to the edge of the image 120A to be identified.

Because only 13 destination images have been identified and that is less than the Optimum Number of 15, the process performs prototype destination image recognition. By comparing destination image 142J to the designated prototype image, it is determined that 142J is actually two touching cookies, and is therefore divided into 142J and 142J' and their locations are transmitted to the destination vision window image output queue. Those two destinations bring the total to 15, and the identification process stops there since that is the Optimum Number.

The routine then proceeds to the next object vision window image, identified as object vision window image 20B, as soon as the object belt moves far enough into position under the object video camera. The object images 42 in image 20B whose locations match the locations of previously identified object images 42M, 42N, 42Q, 42R, 42S, 42T and 42U in image 20A are duplicates of ones identified in the previous object vision window image 20A and their locations are not transmitted to the object vision window image output queue. Object images 42V, 42W, 42Y, 42X, and 42Z are identified as object images. Object images 42M, 42BB and 42CC are too close to the vision window image boundary to be identified. Only seven object images have been identified at this point, and so large object images are now identified by comparing them to the prototype image. The object image 42P (overlapped objects) in image 20A is again not identified. Overlapping objects are generally not identified because the system operates in only two dimensions, so it cannot determine which object is on top and should be picked up first. Object image 42AA (touching objects) is identified as two object images, 42AA and 42AA'. No more object images 42 remain in image 20B. Thus a total of 7 object images and 2 additional prototype object images are identified and entered into the object vision window image output queue to be transmitted to the first robot motion controller input queue.

The routine then proceeds to the next destination vision window image, identified as destination vision window image 120B, as soon as the destination belt moves far enough into position under the destination video camera. The destinations 142 in image 120B whose locations match the locations of previously identified destinations 142N, 142P, 142Q, 142R, 142S, 142T and 142U are duplicates of ones identified in the previous destination vision window image 120A and their locations are not transmitted to the destination vision window output queue. Destination images 142V, 142W, 142X, 142Y and 142Z are identified as destination images and their locations are transmitted to the destination vision window image output queue. Destination images 142M, 142BB and 142CC are too close to the vision window image boundary to be identified. Only five destination images have been identified at this point, and so large destination images are now identified by comparing them to the prototype image. Destination image 142AA is identified as two destination images, 142AA and 142AA'. Thus, a total of seven destination images are identified and entered in the first robot motion controller input queue.

The motion controller 204 for the first robot 200 in the direction of belt travel from the video cameras 12 and 112 receives the object output queue and destination output queue from the image processing unit 14, and they form the object location queue and destination location queue, respectively, for the motion controller 204. The queues are in the order of identification, so that the ones farthest in the direction of belt travel are higher in the queue. The motion controller 204 will direct the robot 200 to pick up objects in the order of the object location input queue (so long as they are in the object pick-up window 120) and place them onto destinations in the order of the destination location input queue (so long as they are in the destination placement window 130). For example, the first object 42A on the object location input queue is likely to be placed to the first destination 142C in the destination location input queue by the first robot 200. However, the next object 42B in the object location input queue may have moved past the object pick-up window 120 by the time robot 200 completes the placement of object 42A to destination 142C. If so, the motion controller 204 for the robot 200 will enter that object location into its object output queue to form the object location queue for the next robot 201, and robot 201 will instead pick up object 42B. By that time, the next destination 142D in the destination location input queue may have moved past the destination placement window 130. If so, the motion controller 204 for the first robot 200 will enter that destination location into its destination output queue to form the destination location queue for the motion controller 205 for the next robot 201.

Figure 9A:
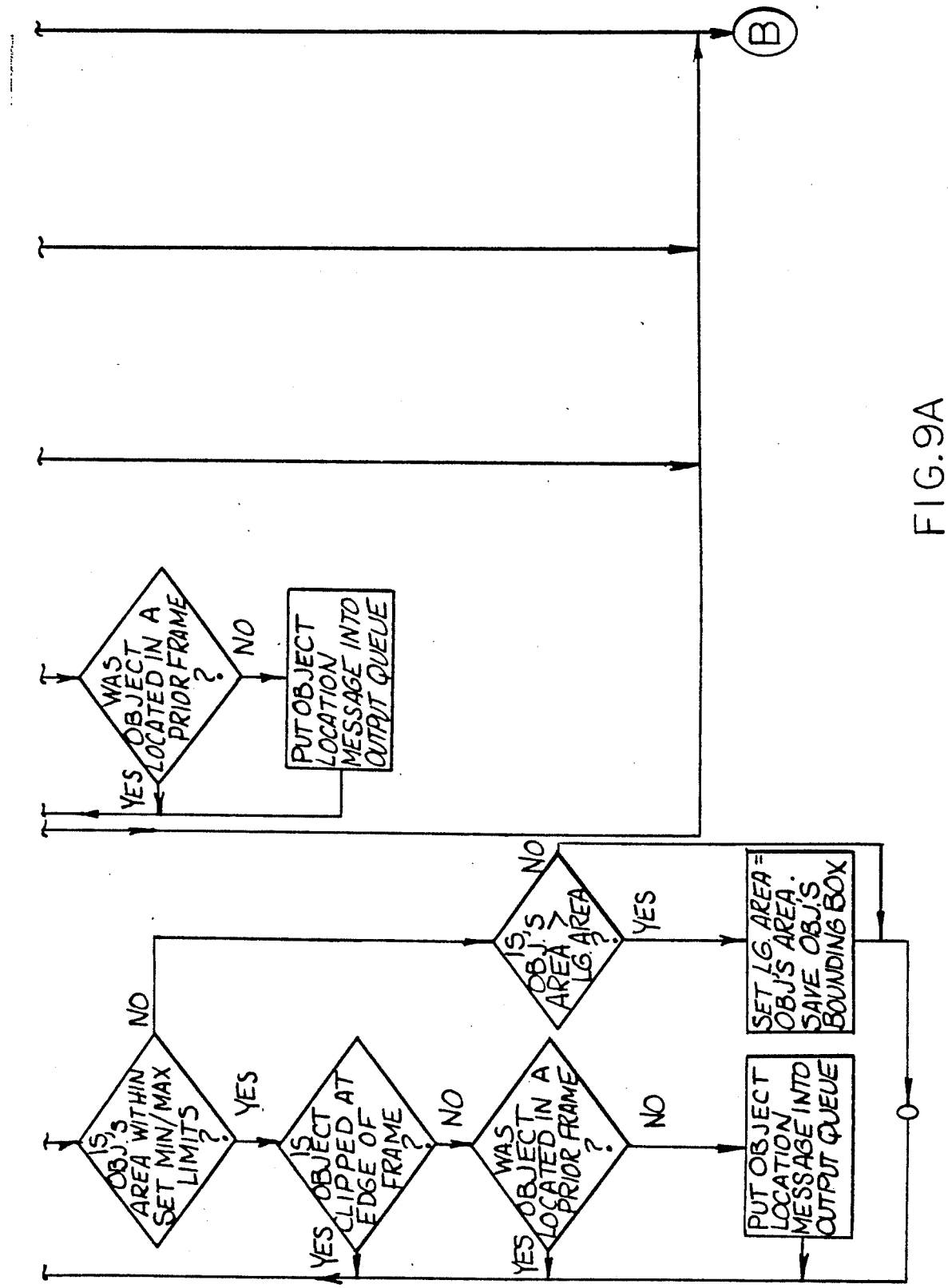
Figure 10:
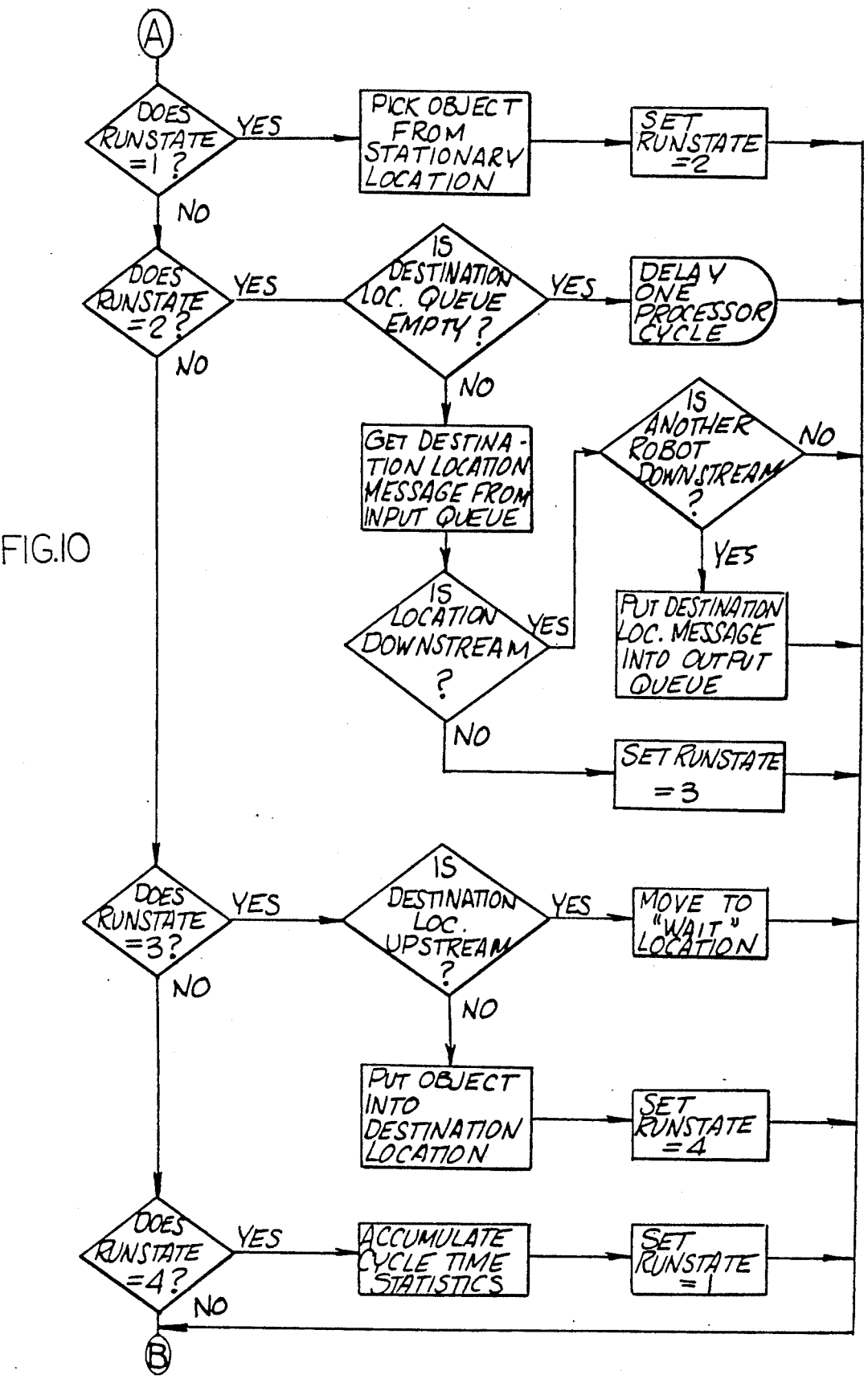
FIG. 10 shows a robot run process for directing the robot to pick up objects from a stationary pick-up point and to deposit them onto a moving destination point.

The system may also be used to pick-up stationary objects and place them to a moving destination belt, according to the process shown in FIGS. 9 and 10. The same main control process is used as in picking up moving objects shown in FIG. 6. FIG. 9 shows the computer program embodiment of the processing of destination vision window images used when picking up stationary objects. The program has three runstates: runstate 1 locates standard destinations, runstate 2 locates nonstandard destinations using a prototype recognition process, and runstate 3 simply waits for the destination belt to move sufficiently to establish a new destination vision window.

The steps of the process are very similar to the steps used in the processing of destination vision window image portion of the process used for picking up objects from a moving object belt and placing them on a moving destination belt. Large Area is set equal to 0, the strobe light is activated to make an image of the destination vision window, and the belt encoder count is recorded. The unit verifies that there is a destination in the destination window, that the destination is within the predetermined minimum and maximum areas, that it is not too close to the window edge, and that it was not located in a previous vision window. It then puts that destination's location into the destination output queue. It does this repeatedly until no destinations remain in the destination vision window image.

If the destination's location is not within the predetermined minimum and maximum areas, then the destination is saved for prototype recognition. After all objects in the vision window have been located, runstate is set equal to 2 and the destinations that were not within the predetermined minimum and maximum areas are analyzed in the same manner as for that step of the process for picking up objects from a moving object belt and placing them on a moving destination belt. Runstate is then set equal to 3 for the system to wait until the belt moves into position for the next destination vision window.

FIG. 9 shows the process followed by the robots for picking up an object from a stationary location and placing it onto a moving destination. The steps of this process are substantially the same as the steps of this portion of the process used in picking up an object from a moving object belt and placing it onto a moving destination belt. Of course, there is no need here to establish an object location queue or to check whether the object is too far upstream or downstream.

The system can be operated in series as shown in FIG. 1. A first vision system 8 together with its object video camera 12, destination video camera 112, monitor 22, image processing unit 14 and associated robots 200 and 201 and their respective motion controllers 204 and 205, serve to pick-up and place as many objects as they can. Then, a second vision system 9 together with its object video camera 13, destination video camera 113, monitor 23, image processing unit 15 and associated robots 202 and 203 and their respective motion controllers 206 and 207, pick up as many of the remaining objects as they can. The number of systems in series is limited only by the capacity of the belt.

The system may be aided with the use of channelling means, such as wedge-shaped devices 210, suspended just above the surface of the object belt to channel the objects 40 and increase their density on the object belt 10 in order to minimize robot arm travel. Such channelling means are likely to be most useful toward the end of the belt where the object densities are relatively low. The channeling means are positioned immediately before a vision system so that the object positions are not changed after being established by the vision system.

It will be apparent that the system can be configured with a variety of belt configurations. For example, a central object belt could be flanked by a series of robots and a destination belt on each side in order to increase the means for picking up objects. The robots on each side of the belt may have their own vision system located on that half of the belt or may share a single vision system which covers the belt from side to side.

What is claimed is:

1. A method for picking up objects from a moving object conveyor belt and transferring them to destinations on a moving destination conveyor belt, comprising:

receiving a pixel image of a first object vision window image portion of said object belt containing images of said objects using first object image-receiving means;

digitizing said first object vision window image by assigning a gray scale level and a coordinate location to the pixels in said first object vision window image;

electronically determining and transmitting, utilizing first data transmission mean, the locations of at least one of said objects represented by object images in said first object vision window image to a first motion controller directing a first robot means associated with said first object image-receiving means located in the direction of belt travel with respect to said first object image-receiving means;

receiving a pixel image of a first destination vision window image portion of said destination belt containing images of said destinations using first destination image-receiving means;

digitizing said first destination vision window image by assigning a gray scale level and a coordinate location to the pixels in said first destination vision window image;

electronically determining and transmitting, utilizing first data transmission means, the locations of at least one of said destinations represented by destination images in said first destination vision window image to said first motion controller;

picking up at least one of said objects represented by object images in said first object vision window, image, the locations of which were transmitted to said first motion controller, using said first robot means;

placing said at least one of said objects to at least one of said destinations represented by destination images in said first destination vision window, the locations of which were transmitted to said first motion controller, using said first robot means;

transmitting, utilizing second data transmission means, the locations of at least one of the objects represented by object images in said first object vision window image which were not picked up by said first robot means, from said first motion controller to a second motion controller directing a second robot means associated with said first object image-receiving means located in the direction of belt travel with respect to said first robot means;

transmitting, utilizing said second data transmission means, the locations of at least one of the destinations represented by destination images in said first destination vision window image to which no object was placed by said first robot means, from said first motion controller to said second motion controller;

picking up at least one of said objects represented by object images in said first object vision window image, the locations of which were transmitted to said second motion controller, using said second robot means; and placing said at least one of said objects represented by object images in said first object vision window image, the locations of which were transmitted to said second motion controller, to at least one of said destinations represented by destination images in said first destination vision window, the locations of which were transmitted to said second motion controller, using said second robot means.

2. The method of claim 1, further comprising:

establishing a binary image of said digitized first object vision window image and first destination vision window image by assigning 0 or 1 to each pixel gray scale value depending on whether said gray scale value is above or below a predetermined threshold value; and determining the location and configuration of said objects and destinations represented by images in said first object vision window image and first destination vision window image using said binary image.

3. The method of claim 1, further comprising:

establishing a pick-up window area on said object belt for each said robot means associated with said first object image-receiving means, and wherein each motion controller which directs each robot means associated with said first object image-receiving means repeatedly directs said robot means to pick up certain of the objects in said robot means' pick-up window area; and establishing a placement window area on said destination belt for each said robot means associated with said first destination image receiving means, and wherein each motion controller which directs each robot means associated with said first destination image-receiving means repeatedly directs said robot means to deposit said certain of said objects in said robot means' placement window area.

4. The method of claim 3, wherein each object that each motion controller directs each robot means to pick up is the object in said robot means' pick-up window area that is farthest in the direction of belt travel; and each destination to which each motion controller directs each robot to place objects is the destination in said robot means' placement window area that is farthest in the direction of belt travel.

5. The method of claim 1, wherein the locations of objects that are smaller than a predetermined minimum area are not transmitted to said first motion controller.

6. The method of claim 1, wherein the locations of objects and destinations with images that are larger than a predetermined maximum area are determined by comparing said larger object and destination images to a predetermined prototype image, and the locations of objects and destinations represented by those larger object and destination images that do not match any of the prototype image within preset tolerances are not transmitted to said first motion controller.

7. The method of claim 5, wherein object and destination images larger than a predetermined maximum area are compared to a prototype image, and those portions of said larger images that match said prototype image within preset tolerances are deemed to be images of individual objects and destinations and their locations are transmitted to said first motion controller.

8. The method of claim 7, further comprising establishing an object vision window image boundary at the edge of said object vision window image and a destination vision window image boundary at the edge of said destination vision window image, and wherein the objects and destinations that are at least partially in said vision window image boundary are not picked up.

9. The method of claim 1, wherein the locations of objects in excess of a predetermined optimum number in each object vision window image are not transmitted to said first motion controller.

10. The method of claim 9, wherein said objects and destinations are located and counted in the order of their distance from one edge of said vision window images.

11. The method of claim 9, wherein said optimum number is equal to the number of objects that the robots associated with said first image-receiving means can pick up considering variables including the speed of the belt and the character of the object.

12. The method of claim 1, further comprising:
receiving a pixel image of a subsequent object vision window portion of said object belt containing images of said objects using said first object image-receiving means, said subsequent object vision window having an edge in the direction of belt travel that is a predetermined distance in the direction opposite belt travel from the edge in the direction of belt travel of the adjacent object vision window in the direction of belt travel;
digitizing said subsequent object vision window image by assigning a gray scale level and a coordinate location to the pixels in said subsequent object vision window image;
electronically determining and transmitting, utilizing said first data transmission means, the locations of at least one of said objects represented by object images in said subsequent object vision window image to said first motion controller directing said first robot means;
receiving a pixel image of a subsequent destination vision window image portion of said destination belt containing images of said destinations using first destination image-receiving means, said subsequent destination vision window having on edge in the direction of belt travel that is a predetermined distance in the direction opposite belt travel from the edge in the direction of belt travel of the adjacent destination vision window in the direction of belt travel;
digitizing said subsequent destination vision window image by assigning a gray scale level and a coordinate location to the pixels in said subsequent destination vision window image;
electronically determining and transmitting, utilizing first data transmission means, the locations of at least one of said destinations represented by destination images in said subsequent destination vision window image to said first motion controller directing a first robot means associated with said first image-receiving means located in the direction of belt travel with respect to said first image-receiving means;
picking up at least one of said objects represented by object images in said subsequent object vision window image the locations of which were transmitted to said first motion controller, using said first robot means;
placing said at least one of said objects to at least one of said destinations represented by destination images in said subsequent destination vision window, the locations of which were transmitted to said first motion controller using said first robot means;
transmitting, utilizing said second data transmission means, the locations of at least one of the objects represented by object images in said subsequent object vision window image which were not picked up by said first robot means, from said first motion controller to said second motion controller;
picking up at least one of said objects represented by object images in said subsequent object vision window image, the locations of which were transmitted to said second motion controller, using said second robot means; and
placing said at least one of said objects represented by object images in said subsequent object vision window image, the locations of which were transmitted to said motion controller, to at least one of said destinations represented by destination images in said subsequent destination vision window, the locations of which were transmitted to said second motion controller, using said second robot means.

13. The method of claim 12, wherein each vision window overlaps each adjacent vision window, and wherein the location of objects and destinations whose locations were in the adjacent vision window in the direction of belt travel and were previously transmitted to said first motion controller, are not transmitted again to said first motion controller.

14. The method of claim 13, wherein each robot means pick-up window area and destination placement window area are areas from which said robot means can efficiently pick up objects without excess motion of the robot means.

15. The method of claim 14, wherein the area of said robot means pick-up window is larger for robot means away from said first object image-receiving means with which they are associated than for robot means close to said first object image-receiving means with which they are associated.

16. The method of claim 3, wherein said robot means includes a plurality of pick-up cups, and each cup is filled with an object before all the objects in the cups are moved to the destinations.

17. The method of claim 13, further comprising:

receiving a pixel image of another first object vision window portion of said object belt using second object image-receiving means in the direction of belt travel from the last robot means in the direction of belt travel associated with said first object image-receiving means;

digitizing said another first object vision window image by assigning a gray scale value level and coordinate location to pixels is said another first object vision window image;

electronically determining and transmitting, utilizing third data transmission means, the locations of at least one of said objects to another first motion controller directing another first robot means located in the direction of belt travel with respect to said second object image-receiving means;

receiving a pixel image of another first destination vision window image portion of said destination belt containing images of said destinations using second destination image-receiving means;

digitizing said another first destination vision window image by assigning a gray scale level and a coordinate location to the pixels in said another first destination vision window image;

electronically determining and transmitting, utilizing said third data transmission means, the locations of at least one of said destinations to another first motion controller directing another first robot means located in the direction of belt travel with respect to said second destination image-receiving means;

picking up at least one of said objects represented by object images in said another first vision window image, the locations of which were transmitted to said another first motion controller, using said another first robot means;

placing said at least one of said objects represented by object images in said another first object vision window image, the locations of which were transmitted to said another first motion controller, to at least one of said destinations represented by destination images in said another first destination vision window, the locations of which were transmitted to said another first motion controller, using said another first robot means; and transmitting, utilizing fourth data transmission means, the locations of at least one of the objects represented by object images in said another first vision window image which were not picked up by said another first robot means, from said another first motion controller to another second motion controller directing another second robot means associated with said second object image-receiving means located in the direction of belt travel with respect to said another first robot means;

picking up at least one of said objects represented by object images in said another first vision window image, the locations of which were transmitted to said another second motion controller, using said another second robot means; and transmitting, utilizing said fourth data transmission means, the locations of at least one of the destinations represented by destination images in said another first destination vision window image to which no object was placed by said another first robot means, from said another first motion controller to said another second motion controller directing another second robot means associated with said second destination image-receiving means located in the direction of belt travel with respect to said another first robot means;

placing said at least one of said objects represented by object images in said another first object vision window image, the locations of which were transmitted to said another second motion controller, to at least one of said destinations represented by destination images in said another first destination vision window, the locations of which were transmitted to said another second motion controller, using said another second robot means.

18. A method for picking up objects from a moving object conveyor belt and moving them to a moving destination conveyor belt, comprising:

receiving a series of overlapping images of object vision window portions of said object belt and destination vision window portions of said destination belt using image-receiving means, said object vision windows and destination vision windows being fixed on the belt and moving therewith;

digitizing each of the object vision window images and destination vision window images in said series, said digitizing including assigning a coordinate location to pixels in said image;

electronically determining and transmitting, utilizing first data transmission means, the locations of at least one of said objects and at least one of said destinations to a first motion controller directing a first robot means, said determining and transmitting being done a vision window image at a time for each vision window image in said series;

picking up at least one of said objects from said object belt using said first robot means at the time it moves within the reach of said first robot means;

placing said at least one of said objects to said at least one of said destinations;

transmitting, utilizing second data transmission means, the locations of at least one of the objects which were not picked up and the destinations to which no object was placed by said first robot means, from said first motion controller to a second motion controller directing a second robot means located in the direction of belt travel with respect to said first robot means;

picking up at least one of said objects using said second robot means at the time the object moves within the reach of said second robot means; and placing said at least one of said objects to said at least one of said destinations.

19. A system for picking up objects located on a moving object conveyor belt and transferring them to destinations on a moving destination conveyor belt, comprising:

image-receiving means to receive pixel images of a series of vision window portions of each of said belts;

image processing means electronically connected with said image-receiving means for assigning a location to objects and destinations represented in said images;

a plurality of robot means in series adjacent to said belts, each with a directing motion controller, wherein the motion controller directing the first robot means receives the locations of objects and destinations from said image processing means utilizing first data transmission means and directs the first robot means to pick up certain of said objects and place them at certain of said destinations, and wherein the motion controller for each robot in said series except the last transmits, utilizing subsequent data transmission means to the next motion controller, the location of objects not picked up and destinations to which no object was placed by the robot it directs or any preceding robot.

20. The system of claim 19, wherein said image processing means determines and transmits to the first motion controller the locations of no more than a predetermined number of objects in each vision window in said series, said number being based on variables including the belt speed and number of robot means in said robot means series.

21. The system of claim 20, wherein said vision windows overlap in the direction of belt travel by a predetermined distance.

22. The system of claim 21 wherein the locations of objects and destinations in each vision window is determined and transmitted to the first motion controller a vision window at a time, and the locations of objects and destinations transmitted to the first motion controller for one vision window are not transmitted to the first motion controller for an adjacent overlapping vision window.

23. The system of claim 22, wherein the objects and destinations that can be reached by each robot means are picked up by said robot means in the order of the direction of belt movement.

24. The system of claim 23, wherein the image processing means does not transmit to the first motion controller the locations of objects smaller than a predetermined minimum area.

25. The system of claim 24, wherein the image processing means compares the shape and size of images that are larger than a predetermined maximum area with a prototype image and assigns separate object and destination locations to each object and destination represented by said larger images if any portion of the larger image matches the prototype image within a predetermined tolerance.

26. The system of claim 24, wherein each of said robot means includes a plurality of end effector cups for picking up objects.

27. A system for picking up stationary objects and transferring them to destinations on a moving destination conveyor belt, comprising:

image-receiving means to receive pixel images of a series of vision window portions of said destination belt;

image processing means electronically connected with said image-receiving means for assigning a location to destinations represented in said images;

a plurality of robot means in series adjacent to said destination belt, each with a directing motion controller, wherein the motion controller directing the first robot means receives the locations of destinations from said image processing means utilizing first data transmission means and directs the first robot means to pick up objects and place them at certain of said destinations, and wherein the motion controller for each robot in said series except the last transmits, utilizing subsequent data transmission means to the next motion controller, the location of destinations to which no object was placed by the robot it directs or any preceding robot.

28. The system of claim 27, wherein said vision windows overlap in the direction of belt travel by a predetermined distance.

29. The system of claim 27 wherein the locations of destinations and destinations in each vision window is determined and transmitted to the first motion controller a vision window at a time, and the locations of destinations transmitted to the first motion controller for one vision window are not transmitted to the first motion controller for an adjacent overlapping vision window.

30. The system of claim 29, wherein the destinations that can be reached by each robot means are picked up by said robot means in the order of the direction of destination belt movement.

31. The system of claim 30, wherein the image processing means compares the shape and size of images that are larger than a predetermined maximum area with a prototype image and assigns separate and destination locations to each destination represented by said larger images if any portion of the larger image matches the prototype image within a predetermined tolerance.

32. The system of claim 31, wherein each of said robot means includes a plurality of end effector cups for picking up objects.

* * * * *